US012514830B2

(12) United States Patent
De Luca et al.

(10) Patent No.: US 12,514,830 B2
(45) Date of Patent: Jan. 6, 2026

(54) IDEBENONE FOR THE TREATMENT OF ACUTE RESPIRATORY DISTRESS SYNDROME (ARDS) IN PATIENTS DIAGNOSED WITH A CORONAVIRUS INFECTION

(71) Applicant: BEMIDO SA, Geneva (CH)

(72) Inventors: Giampiero De Luca, Geneva (CH); Alessandro Berti, Geneva (CH)

(73) Assignee: BEMIDO SA, Geneva (CH)

( * ) Notice: Subject to any disclaimer, the term of this patent is extended or adjusted under 35 U.S.C. 154(b) by 658 days.

(21) Appl. No.: 17/911,781

(22) PCT Filed: Mar. 19, 2021

(86) PCT No.: PCT/EP2021/057140
§ 371 (c)(1),
(2) Date: Sep. 15, 2022

(87) PCT Pub. No.: WO2021/186061
PCT Pub. Date: Sep. 23, 2021

(65) Prior Publication Data
US 2023/0127518 A1    Apr. 27, 2023

(30) Foreign Application Priority Data
Mar. 19, 2020 (EP) ..................... 20164352

(51) Int. Cl.
*A61K 31/122* (2006.01)
*A61K 31/167* (2006.01)
*A61K 31/427* (2006.01)
*A61K 31/4706* (2006.01)
*A61K 31/513* (2006.01)
*A61K 31/675* (2006.01)
*A61K 39/395* (2006.01)
*A61P 11/00* (2006.01)
*A61P 31/14* (2006.01)

(52) U.S. Cl.
CPC .......... *A61K 31/122* (2013.01); *A61K 31/167* (2013.01); *A61K 31/427* (2013.01); *A61K 31/4706* (2013.01); *A61K 31/513* (2013.01); *A61K 31/675* (2013.01); *A61K 39/3955* (2013.01); *A61P 11/00* (2018.01); *A61P 31/14* (2018.01); *C07K 2317/21* (2013.01)

(58) Field of Classification Search
None
See application file for complete search history.

(56) References Cited

U.S. PATENT DOCUMENTS 10,980,756 B1 *  4/2021  Glick ................... A61K 31/135
2010/0129431 A1   5/2010  Schwarz et al.

FOREIGN PATENT DOCUMENTS

| JP | H11-116470 A | 4/1999 |
| WO | WO-99/07355 A1 | 2/1999 |
| WO | WO-2008/019769 A1 | 2/2008 |

OTHER PUBLICATIONS

Roche wins approval for Acemra for coronavirus complications Mar. 5, 2020.*
"Servais et al. Long-term data with idebenone on respiratory function outcomes in patients with Duchenne muscular dystrophy". Jan. 2020.*
Aljofan et al., "COVID-19 Treatment: The Race Against Time," Electron J Gen Med. 17(6):em227 (Apr. 2020) (3 pages).
Buyse et al., "Efficacy of idebenone on respiratory function in patients with Duchenne muscular dystrophy not using glucocorticoids (DELOS): a double-blind randomised placebo-controlled phase 3 trial," Lancet. 385(9979):1748-1757 (May 2015).
Chen et al., "Epidemiological and clinical characteristics of 99 cases of 2019 novel coronavirus pneumonia in Wuhan, China: a descriptive study," Lancet. 395(10223):507-513 (Feb. 15, 2020; published online Jan. 29, 2020).
Huang et al., "Clinical features of patients infected with 2019 novel coronavirus in Wuhan, China," Lancet. 395(10223):497-506 (Feb. 15, 2020).
International Search Report and Written Opinion for International Patent Application No. PCT/EP2021/057140, mailed Jun. 4, 2021 (9 pages).
Matthay et al., "Acute respiratory distress syndrome," Nat Rev Dis Primers. 5(1):18 (Mar. 2019) (22 pages).
Al-Samydai et al., "Investigation into the prophylactic and therapeutic activity of coenzyme Q10 against COVID-19," Trop J Pharm Res. 20(11):2387-2393. (Nov. 2021).

* cited by examiner

*Primary Examiner* — Danah Al-Awadi
(74) *Attorney, Agent, or Firm* — Clark & Elbing LLP

(57) ABSTRACT

The present invention relates to idebenone for treating Acute Respiratory Distress Syndrome (ARDS) associated with a viral infection, particularly a coronavirus infection, such as Severe acute respiratory syndrome coronavirus 2 (SARS-CoV-2).

10 Claims, No Drawings

IDEBENONE FOR THE TREATMENT OF ACUTE RESPIRATORY DISTRESS SYNDROME (ARDS) IN PATIENTS DIAGNOSED WITH A CORONAVIRUS INFECTION

The present invention relates to idebenone for treating Acute Respiratory Distress Syndrome (ARDS) associated with a viral infection, particularly a coronavirus infection, such as Severe acute respiratory syndrome coronavirus 2 (SARS-CoV-2).

BACKGROUND OF THE INVENTION

The acute respiratory distress syndrome (ARDS) is a common cause of respiratory failure in critically ill patients and is defined by the acute onset of noncardiogenic pulmonary edema, hypoxemia, and the need for mechanical ventilation. ARDS occurs most often in the setting of pneumonia, sepsis, aspiration of gastric contents or severe trauma, and is present in ~10% of all intensive care unit patients worldwide. Despite some improvements over the past decades, mortality remains high at 30-40% in most studies. Pathologic specimens from patients with ARDS most frequently reveal diffuse alveolar damage, and laboratory studies have demonstrated both alveolar epithelial and lung endothelial injury, resulting in accumulation of protein-rich inflammatory edema fluid in the alveolar space. Patient management focuses on implementing a lung-protective ventilation strategy; no specific pharmacotherapies have been identified. Long-term outcomes of patients with ARDS are increasingly recognized as important research targets, as many patients survive ARDS only to suffer ongoing functional and/or psychologic sequelae. ARDS develops most commonly in the setting of pneumonia (bacterial and viral; fungal is less common), non-pulmonary sepsis (with sources that include the peritoneum, urinary tract, soft tissue and skin), aspiration of gastric and/or oral and esophageal contents (which may be complicated by subsequent infection) and major trauma (such as blunt or penetrating injuries or burns). Several other less common scenarios are also associated with the development of ARDS, including acute pancreatitis; transfusion of fresh frozen plasma, red blood cells and/or platelets; drug overdose with various agents; near drowning (inhalation of fresh or salt water); haemorrhagic shock or reperfusion injury (including after cardiopulmonary bypass and lung resection); and smoke inhalation (often associated with cutaneous burn injuries) (Matthay et al. Nat Rev Dis Primers. 2019 Mar. 14; 5(1): 18).

Severe acute respiratory syndrome coronavirus 2 (SARS-CoV-2) was first reported in Wuhan, Hubei Province, China and has subsequently spread to other regions of China and 37 countries, including the United States, Japan, Australia, Italy and France. SARS-CoV-2, which belongs to a unique clade of the sarbecovirus subgenus of the Orthocoronavirinae subfamily, was identified as the pathogen of coronavirus disease 2019 (COVID-19) in January 2020.

As reported by Huang et al. (Lancet. 2020; 395(10223): 497-506) patients with COVID-19 present primarily with fever, myalgia or fatigue, and dry cough. Although most patients are thought to have a favorable prognosis, older patients and those with chronic underlying conditions may have worse outcomes. Patients with severe illness may develop dyspnea and hypoxemia within 1 week after onset of the disease, which may quickly progress to acute respiratory distress syndrome (ARDS) or end-organ failure (Chen et al. Lancet. 2020; 395(10223):507-513).

DESCRIPTION OF THE INVENTION

The present invention relates to idebenone (2,3-dimethoxy-5-methyl-6-(10-hydroxydecyl)-1,4-benzoquinone) for the prophylaxis and/or treatment of respiratory disorders, particularly Acute Respiratory Distress Syndrome (ARDS), associated with a viral infection, particularly in a patient suffering from a coronavirus infection, more particularly in a patient suffering from an infection with SARS-CoV2, even more particularly in a patient diagnosed with COVID-19.

"Idebenone" is understood to mean 2-(10-hydroxydecyl)-5,6-dimethoxy-3-methyl-cyclohexa-2,5-diene-1,4-dione, which is sold for example under the trade name Raxone® by Santhera Pharmaceuticals.

Idebenone is a synthetic molecular formula similar to coenzyme Q10. Chemically, it is an organic compound of the family of quinones that can slow the loss of respiratory function. Recent clinical studies have shown that long-term treatment with idebenone consistently reduced the rate of respiratory function loss in patients with Duchenne muscular dystrophy (DMD) for up to 6 years in a real-world setting.

In the present invention we disclose the use of idebenone for managing a respiratory disorder associated with a viral infection, particularly Acute Respiratory Distress Syndrome (ARDS) in patients suffering from a viral infection, particularly from a coronavirus infection, more particularly from an infection with SARS-CoV2 associated with COVID-19. In certain embodiments, administration of idebenone will reduce the rate of inspiratory and/or expiratory functional loss and/or reduce respiratory complications and/or reduce bronchopulmonary adverse events. In further embodiments, idebenone will preserve respiratory function above clinically meaningful thresholds for forced vital capacity. In still a further embodiment, idebenone will reduce the risk of bronchopulmonary complications and the need for systemic antibiotics.

The patient is particularly a human patient, more particularly a patient who has been already diagnosed with viral infection, e.g. COVID-19.

Idebenone can be combined with excipients, fillers, solvents, diluents, dyes and/or binders. The choice of auxiliary substances as well as the amounts thereof to be used depends on whether the medicinal drug is to be administered orally, via the oral mucosa, intravenously, intraperitoneally, intradermally, intramuscularly, intranasally, buccally or topically.

In the context of the present invention, idebenone may be administered systemically or locally. In a preferred embodiment, idebenone is administered orally. For oral application suitable preparations are in the form of tablets, sugar-coated pills, capsules, granular powders, drops, juices and syrups, while for parenteral, topical and inhalative application suitable forms are solutions, suspensions, easily reconstitutable dry preparations as well as sprays. Idebenone can be administered in a sustained-release preparation, in dissolved form or in a plaster, optionally with the addition of agents promoting penetration of the skin and are suitable as percutaneous application preparations. Forms of preparations that can be used orally or percutaneously may produce a delayed release of the compounds; idebenone formulations are e.g. described in several patents, for example in WO 99/07355, JP11116470 and WO 2008/019769.

Idebenone is administered in a therapeutically effective amount depending on the type and severity of the disorder and the route of administration. In certain embodiments, idebenone is administered to a human patient in a daily dose of about 100 mg to about 3000 mg, particularly about 300 mg to about 1500 mg, e.g. about 900 mg.

In a further preferred embodiment, idebenone may be administered in combination with a second therapeutic agent, wherein said second therapeutic agent is preferably selected from antiviral agents (e.g. remdesivir, lopinavir/ritonavir), tocilizumab, hydroxychloroquine, analgesics or antipyretics (e.g. paracetamol) and Nonsteroidal anti-inflammatory drugs (NSAIDs), or a mixture thereof. Preferably, idebenone is not administered together with glucocorticoids.

According to the present invention, administration of idebenone is preferably started in an early stadium of the disease, e.g. when the first signs and symptoms of the disorder, e.g. fever, difficulty in breathing, are observed and/or when only the upper airways are inflicted. In this embodiment, occurrence of bronchopulmonary complications, particularly ARDS, may be delayed or even prevented.

Idebenone and the further active agent can be administered simultaneously, separately or sequentially in order to treat, manage the respiratory disorder, particularly Acute Respiratory Distress Syndrome (ARDS) and/or prevent its complications. The two active agents may be provided in a single dosage form or a separate formulation, each formulation containing at least one of the two active agents.

A further aspect of the invention relates to a method for treating or preventing a respiratory disorder, particularly Acute Respiratory Distress Syndrome (ARDS), associated with a viral infection, comprising administering idebenone in a therapeutically effective amount to a subject, particularly a human subject in need thereof.

The following examples further illustrate the invention.

EXAMPLES

Example 1—Efficacy of Idebenone on Acute Respiratory Distress Syndrome (ARDS) Associated with COVID-19

Patients infected by the Severe acute respiratory syndrome coronavirus 2 (SARS-CoV-2) will receive idebenone 300 mg/day, 600 mg/day, 900 mg/day or 1200 mg/day. Some patients will also concomitantly receive a second therapeutic agent, such as remdesivir, tocilizumab, hydroxychloroquine or a mixture thereof.

The invention claimed is:

1. A method for treating a respiratory disorder associated with a viral infection, comprising administering idebenone in a therapeutically effective amount to a subject in need thereof, wherein the respiratory disorder is Acute Respiratory Distress Syndrome (ARDS), and wherein the viral infection is a Severe acute respiratory syndrome coronavirus 2 (SARS-CoV-2) infection.

2. The method of claim 1, wherein idebenone is administered orally.

3. The method of claim 1, wherein idebenone is administered at about 100 mg/daily to about 3000 mg/daily.

4. The method of claim 3, wherein idebenone is administered at about 900 mg/day.

5. The method of claim 1, wherein idebenone is administered in combination with a second therapeutic agent.

6. The method of claim 5, wherein the second therapeutic agent is remdesivir.

7. The method of claim 5, wherein the second therapeutic agent is tocilizumab.

8. The method of claim 5, wherein the second therapeutic agent is hydroxychloroquine.

9. The method of claim 5, wherein the second therapeutic agent is lopinavir and/or ritonavir.

10. The method of claim 5, wherein the second therapeutic agent is paracetamol.

* * * * *